United States Patent
Yuan et al.

(10) Patent No.: US 9,923,463 B2
(45) Date of Patent: Mar. 20, 2018

(54) CONSTANT ON-TIME SWITCHING CONVERTER WITH REFERENCE VOLTAGE ADJUSTING CIRCUIT AND CONTROLLER THEREOF

(71) Applicant: Chengdu Monolithic Power Systems, Ltd., Chengdu (CN)

(72) Inventors: Wei Yuan, Hangzhou (CN); Qian Ouyang, Hangzhou (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 0 days.

(21) Appl. No.: 15/258,931

(22) Filed: Sep. 7, 2016

(65) Prior Publication Data

US 2017/0070148 A1    Mar. 9, 2017

(30) Foreign Application Priority Data

Sep. 7, 2015   (CN) .......................... 2015 1 0562550

(51) Int. Cl.
*H02M 3/158*   (2006.01)
*H02M 1/00*    (2006.01)
*H02M 1/12*    (2006.01)

(52) U.S. Cl.
CPC ............. *H02M 3/158* (2013.01); *H02M 1/12* (2013.01); *H02M 2001/0025* (2013.01)

(58) Field of Classification Search
CPC .... H02M 3/158; H02M 3/156; H02M 3/1588; H02M 2001/0016; H02M 2001/0025; H02M 2001/0019; H02M 2003/1566; H02M 2001/0029; H02M 2001/0038
See application file for complete search history.

(56) References Cited

U.S. PATENT DOCUMENTS

| | | | | |
|---|---|---|---|---|
| 9,356,510 | B2 * | 5/2016 | Jiang | ................. H02M 3/156 |
| 9,653,992 | B2 * | 5/2017 | Yuan | ................. H02M 3/156 |
| 2010/0134080 | A1 | 6/2010 | Ouyang | |
| 2010/0181983 | A1 | 7/2010 | Ouyang | |

(Continued)

OTHER PUBLICATIONS

U.S. Appl. No. 14/752,638, filed Jun. 26, 2015, Chengdu Monolithic Power Systems Co.,Ltd., Chengdu, CHINA.

*Primary Examiner* — Adolf Berhane
*Assistant Examiner* — Sisay G Tiku
(74) *Attorney, Agent, or Firm* — Perkins Coie LLP

(57) ABSTRACT

A COT switching converter includes a switching circuit having a main switch, an on-time control circuit configured to generate an on-time control signal, a comparing circuit, a logic circuit and a reference voltage adjusting circuit. The comparing circuit compares a reference voltage with a feedback signal indicative of output voltage of the switching circuit to generate a comparison signal. Based on the on-time control signal and the comparison signal, the logic circuit generates a control signal of the main switch. The reference voltage adjusting circuit generates the reference voltage based on a basic reference voltage and the control signal, in each switching cycle of the switching converter, the reference voltage is pulled down when the main switch is turned ON and increases with a slew rate until the main switch is turned ON again in the next switching cycle or the reference voltage increases to a maximum value.

16 Claims, 10 Drawing Sheets

(56) References Cited

U.S. PATENT DOCUMENTS

| | | | | |
|---|---|---|---|---|
| 2012/0043951 A1* | 2/2012 | Kuo | ............... | H02M 3/158 |
| | | | | 323/282 |
| 2012/0146606 A1 | 6/2012 | Li et al. | | |
| 2013/0038301 A1* | 2/2013 | Ouyang | ............ | H02M 3/156 |
| | | | | 323/271 |
| 2013/0147454 A1* | 6/2013 | Wang | ............... | G05F 1/618 |
| | | | | 323/283 |
| 2013/0257399 A1* | 10/2013 | Jiang | ............ | G05F 1/10 |
| | | | | 323/271 |
| 2014/0035654 A1 | 2/2014 | Jiang et al. | | |
| 2014/0092645 A1* | 4/2014 | Yang | ............ | H02M 3/33515 |
| | | | | 363/21.13 |
| 2015/0177756 A1* | 6/2015 | Yuan | ............ | G05F 1/56 |
| | | | | 323/271 |
| 2015/0188433 A1* | 7/2015 | Jiang | ............ | H02M 3/158 |
| | | | | 323/271 |
| 2015/0244262 A1* | 8/2015 | Ouyang | ............ | H02M 3/158 |
| | | | | 323/283 |
| 2016/0164416 A1* | 6/2016 | Li | ............ | H02M 3/158 |
| | | | | 323/282 |
| 2017/0187282 A1* | 6/2017 | Wang | ............ | H02M 1/12 |

* cited by examiner

CONSTANT ON-TIME SWITCHING CONVERTER WITH REFERENCE VOLTAGE ADJUSTING CIRCUIT AND CONTROLLER THEREOF

CROSS-REFERENCE TO RELATED APPLICATIONS

This application claims the benefit of CN application 201510562550.7 filed on Sep. 7, 2015, and incorporated herein by reference.

TECHNICAL FIELD

The present invention generally relates to electronic circuits, and more particularly but not exclusively to constant on-time switching converters and controllers thereof.

BACKGROUND

COT (constant on-time) control method is widely used in power supply area due to its simple structure and excellent transient response. Nevertheless, for switching converters with COT control, there may be a sub-harmonic oscillation at the output voltage because of the insufficient ESR (equivalent series resistance) of the output capacitor.

To avoid this sub-harmonic oscillation, a compensation signal in phase with the inductor current is often employed. FIG. 1 illustrates a schematic of a prior COT switching converter 100, wherein a ramp compensation generator consisting of a resistor Rramp and a capacitor Cramp is coupled to the inductor L in parallel. The compensation signal RAMP generated by the ramp compensation generator is added to a feedback signal FB to avoid this sub-harmonic oscillation.

However, the compensation signal may affect the average value of the feedback signal FB and results in poor load and line regulation. Also, the resistor Rramp coupled between the switching node SW and the feedback signal FB affects the load transient quite much. When the switching converter works in CCM mode, the ringing and noise from the switching node SW may be conducted to feedback signal FB through the ramp compensation generator when the switches M1 and M2 are turned OFF, and may cause the double pulse problem. In addition, the parameters of the ramp compensation generator shown in FIG. 1 are difficult to determine under the different input voltages, output voltages and switching frequencies.

SUMMARY

Embodiments of the present invention are directed to a constant on-time controller used in a switching converter, the switching converter includes a switching circuit having a main switch. The controller comprises: an on-time control circuit configured to generate an on-time control signal which is used to control the on-time of the main switch; a comparing circuit having a first input terminal, a second input terminal and an output terminal, wherein the first input terminal is coupled to receive a feedback signal indicative of the output voltage of the switching circuit, the second input terminal is coupled to receive a reference voltage, wherein the comparing circuit compares the reference voltage and the feedback signal and generates a comparison signal at the output terminal; a logic circuit coupled to the on-time control circuit and the comparing circuit, wherein based on the on-time control signal and the comparison signal, the logic circuit generates a control signal to control the main switch; and a reference voltage adjusting circuit coupled to the logic circuit, wherein based on a basic reference voltage and the control signal, the reference voltage adjusting circuit generates the reference voltage, wherein in each switching cycle of the switching converter, the reference voltage is pulled down when the main switch is turned ON and increases with a slew rate until the main switch is turned ON again in the next switching cycle or the reference voltage increases to a maximum value.

BRIEF DESCRIPTION OF THE DRAWING

The present invention can be further understood with reference to the following detailed description and the appended drawings, wherein like elements are provided with like reference numerals.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

It is to be understood that "substantially" is a term of art, and is meant to convey the principle that relationship such simultaneity or perfect synchronization cannot be met with exactness, but only within the tolerances of the technology available to a practitioner of the art under discussion.

Figure 2:
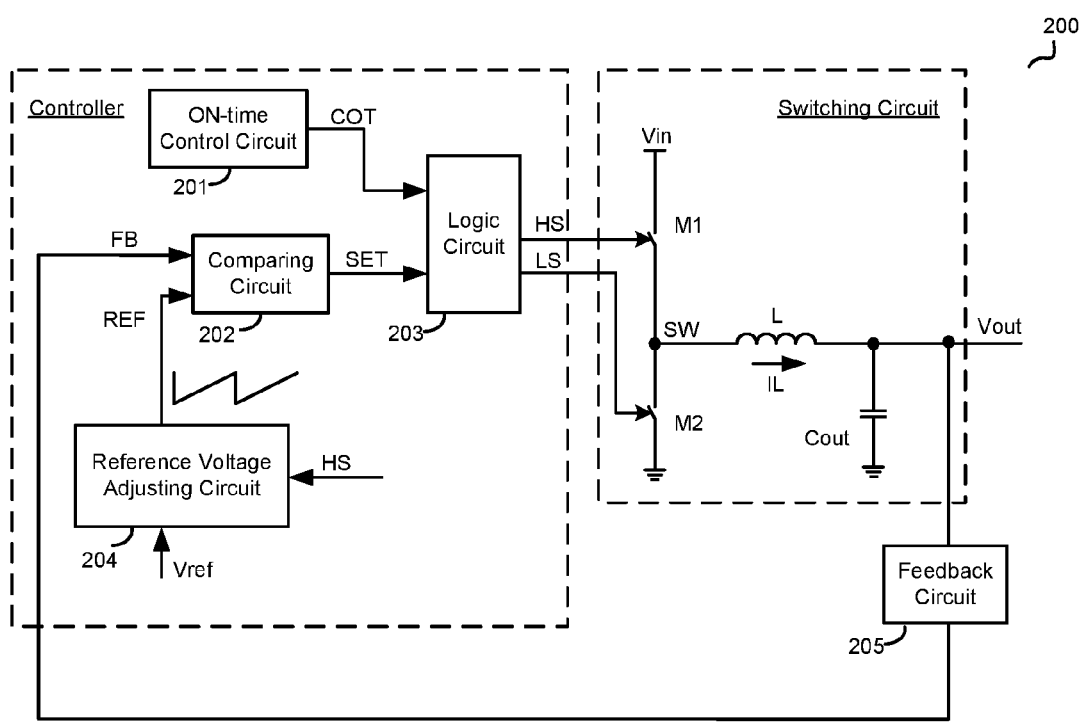
FIG. 2 illustrates a block diagram of a switching converter 200 in accordance with an embodiment of the present invention.

FIG. 2 illustrates a block diagram of a switching converter 200 in accordance with an embodiment of the present invention. The switching converter 200 comprises a controller, a switching circuit and a feedback circuit 205. The switching circuit is applied in synchronous buck converter and comprises switches M1, M2, an inductor L, an output capacitor Cout. The switching circuit is configured to convert an input voltage Vin into an output voltage Vout via turning ON and OFF of switches M1 and M2. The switch M1 has a first terminal, a second terminal and a control terminal, wherein the first terminal is coupled to receive the input voltage Vin. The switch M2 has a first terminal, a second terminal and a control terminal, wherein the first terminal is coupled to the second terminal of the switch M1 to form the switching node SW, the second terminal is coupled to ground. The inductor L has a first terminal and a second terminal, wherein the first terminal is coupled to the second terminal of the switch M1 and the first terminal of the switch M2. The output capacitor Cout is coupled between the second terminal of the inductor L and ground, the voltage across the output capacitor Cout is the output voltage Vout. Even though in the embodiment shown in FIG. 2, the switches M1, M2, the inductor L and the output capacitor Cout constitute a synchronous BUCK converter. However, it is apparent to those skilled in the art that the switch M2 may be replaced by a diode to form a non-synchronous BUCK converter. Moreover, the present invention is also applicable to other suitable topologies, such as synchronous or asynchronous buck converter, flyback converter or forward converter and so on. The switches in the switching circuit may be any controllable semiconductor devices, such as MOS-FET (metal oxide semiconductor field effect transistor), IGBT (isolated gate bipolar transistor) and so on.

The feedback circuit 205 has an input terminal and an output terminal, wherein the input terminal is coupled to the output terminal of the switching circuit to receive the output voltage Vout, the feedback circuit 205 generates a feedback signal FB indicative of the output voltage at the output terminal. The feedback circuit 205 may consist of a resistor divider, or even just a wire where the feedback signal FB is equal to the output voltage Vout.

The controller comprises an on-time control circuit 201, a comparing circuit 202, a logic circuit 203 and a reference voltage adjusting circuit 204. The on-time control circuit 201 is configured to generate an on-time control signal COT to control the on-time of the switch M1. The on-time of the switch M1 may be a constant value or a variable value related to the input voltage Vin or the output voltage Vout. The comparing circuit 202 has a first input terminal, a second input terminal and an output terminal, wherein the first input terminal is coupled to the feedback circuit 205 to receive the feedback signal FB, the second input terminal is coupled to receive a reference voltage REF, wherein the comparing circuit 202 compares the reference voltage REF and the feedback signal FB and generates a comparison signal SET at the output terminal.

The logic circuit 203 is coupled to the on-time control circuit 201 and the comparing circuit 202, wherein based on the on-time control signal COT and the comparison signal SET, the logic circuit 203 generates control signals HS and LS to respectively control switches M1 and M2. Generally, when the on-time of the switch M1 reaches the on-time set by the on-time control circuit 201, the switch M1 is turned OFF, and the switch M2 is turned ON. Normally, to prevent cross conduction of switches M1 and M2, a dead time is set between control signals HS and LS. Moreover, the controller further comprises a minimum off-time control circuit to prevent the comparing circuit 202 from being affected by the system noise. The comparison signal SET is disabled by the minimum off-time control circuit during a minimum off-time $TOFF_{MIN}$. The minimum off-time control circuit is well-known to the person skilled in the art and will not be described in detail The reference voltage adjusting circuit 204 is coupled to the logic circuit 203, based on a basic reference voltage Vref and the control signal HS, the reference voltage adjusting circuit 204 generates the reference voltage REF, wherein in each switching cycle of the switching converter, the reference voltage REF is pulled down when the switch M1 is turned ON, and then increases with a slew rate until the reference voltage REF increases to a maximum value. The maximum value may equal to the basic reference voltage Vref. In another embodiment, the maximum value substantially equals to the basic reference voltage Vref, for example, the difference between the maximum value and the basic reference voltage Vref may be from 20 mV to 40 mV.

Figure 1:
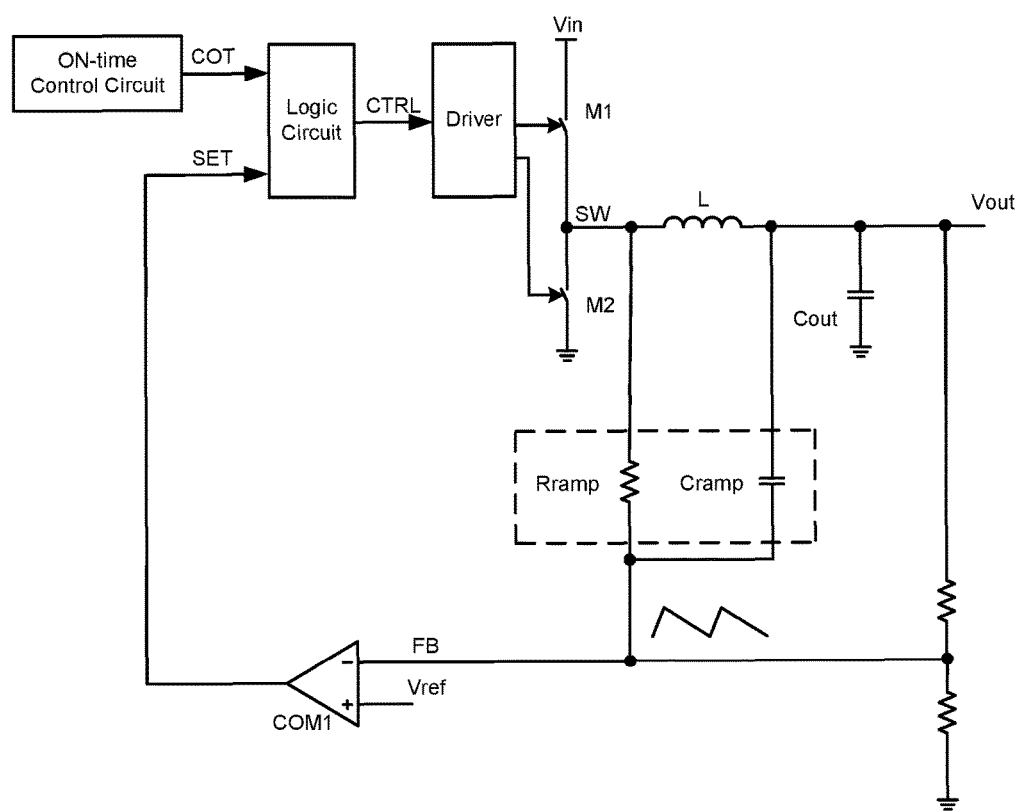
FIG. 1 illustrates a schematic of a prior COT switching converter 100.
Figure 3A:
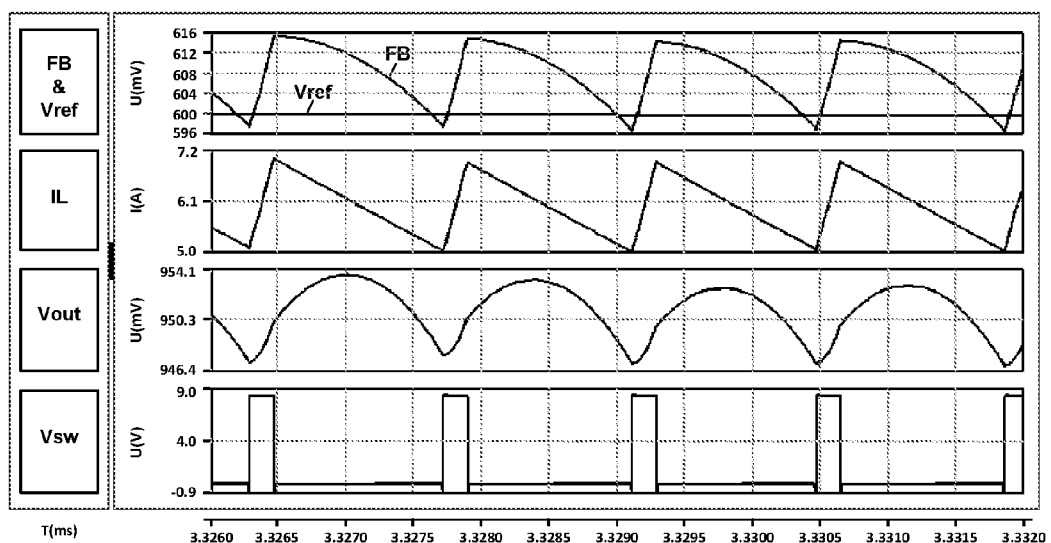
FIG. 3A illustrates working waveforms of the prior switching converter 100 shown in FIG. 1 during stable state.
Figure 3B:
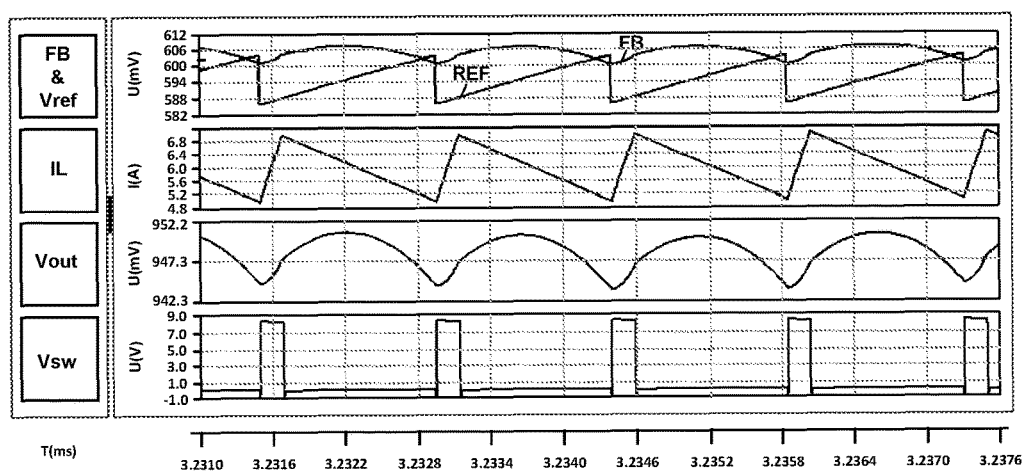
FIG. 3B illustrates working waveforms of the switching converter 200 shown in FIG. 2 during stable state.
Figure 4A:
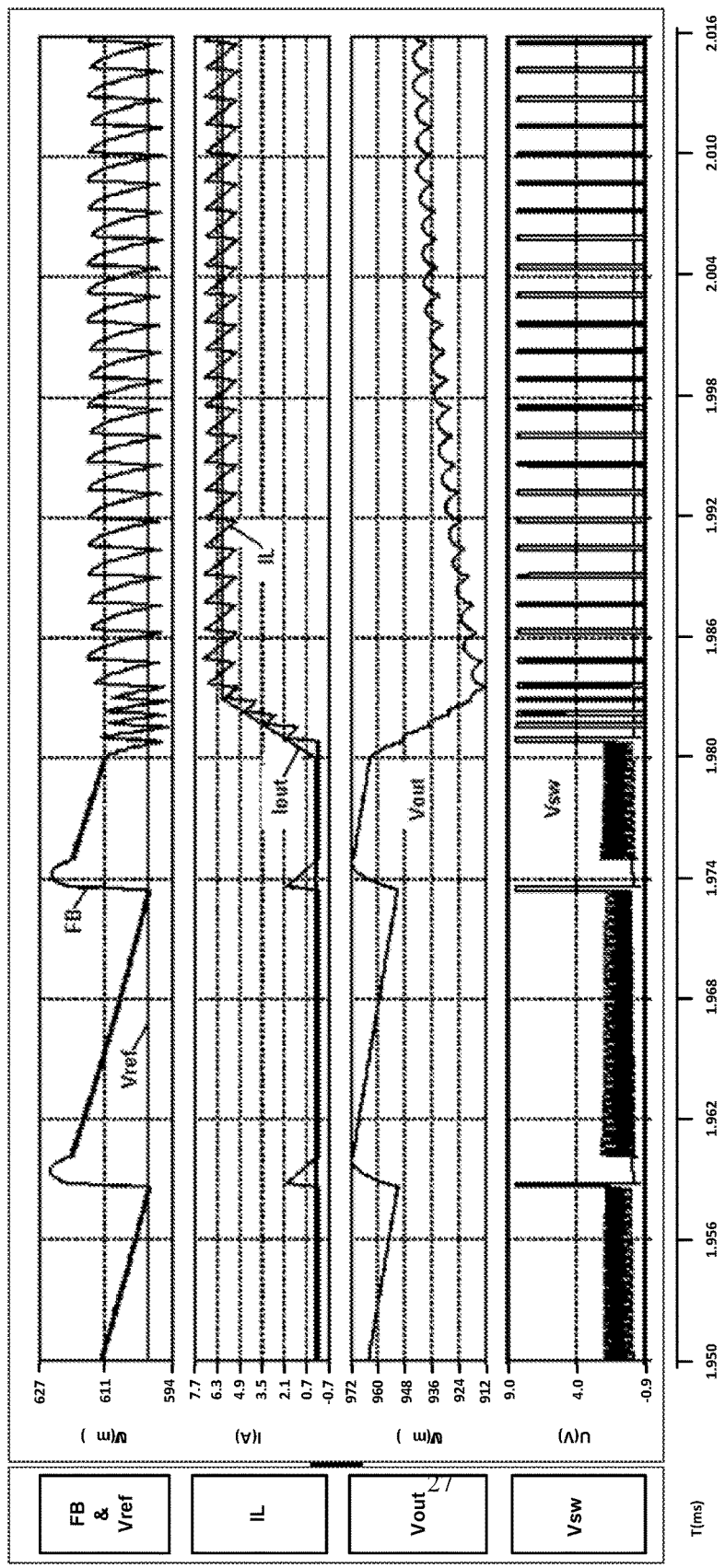
FIG. 4A illustrates working waveforms of the prior switching converter 100 shown in FIG. 1 during load transient change.
Figure 4B:
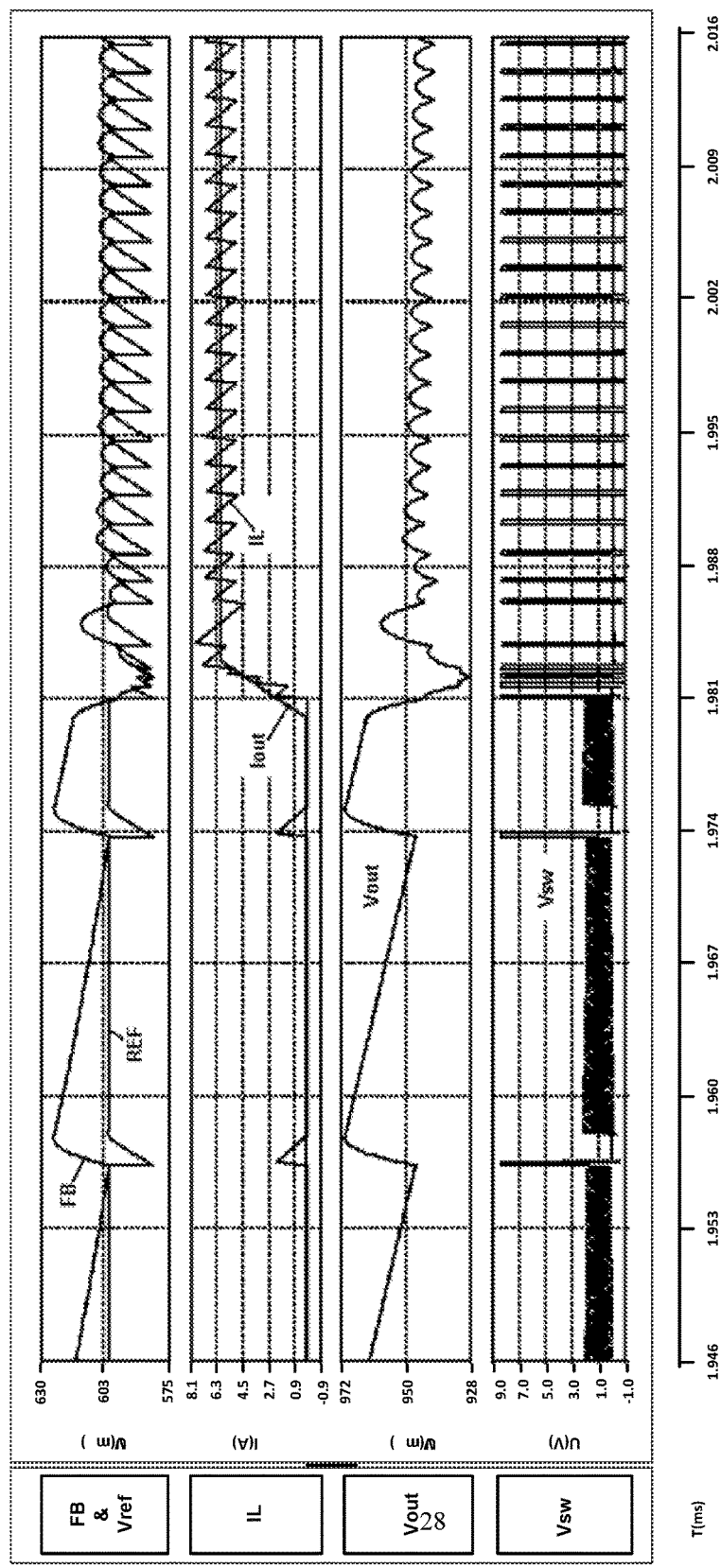
FIG. 4B illustrates working waveforms of the switching converter 200 shown in FIG. 2 during load transient change.

FIG. 3A illustrates working waveforms of the prior switching converter 100 shown in FIG. 1 during stable state. FIG. 3B illustrates working waveforms of the switching converter 200 shown in FIG. 2 during stable state. FIG. 4A illustrates working waveforms of the prior switching converter 100 shown in FIG. 1 during load transient change. FIG. 4B illustrates working waveforms of the switching converter 200 shown in FIG. 2 during load transient change. As shown in FIGS. 3A-4B, wherein IL represents a current flowing through the inductor L, Vsw represents the voltage at the switching node SW and Iout represents an output current of the switching circuit. It can be seen from FIG. 3B, the ramp compensation of FIG. 2 is added to the basic reference voltage Vref instead of the feedback signal FB, so the feedback signal FB is no longer affected by the ramp compensation like in the prior art, and therefore the load and line regulation of the switching converter is effectively improved. This can avoid the ringing and noise issue from the switching node SW during DCM mode. Moreover, owing to the feedback signal FB only reflects the output voltage Vout at any time, which can effectively improve the transient response. Referring now to FIGS. 4A and 4B, compared with the prior example shown in FIG. 1, the embodiment shown in FIG. 2 can provide a much faster ramp rate of the current IL average caused by the load increase, additionally, the off-time of the switch M1 is shorter over the prior art.

Figure 5:
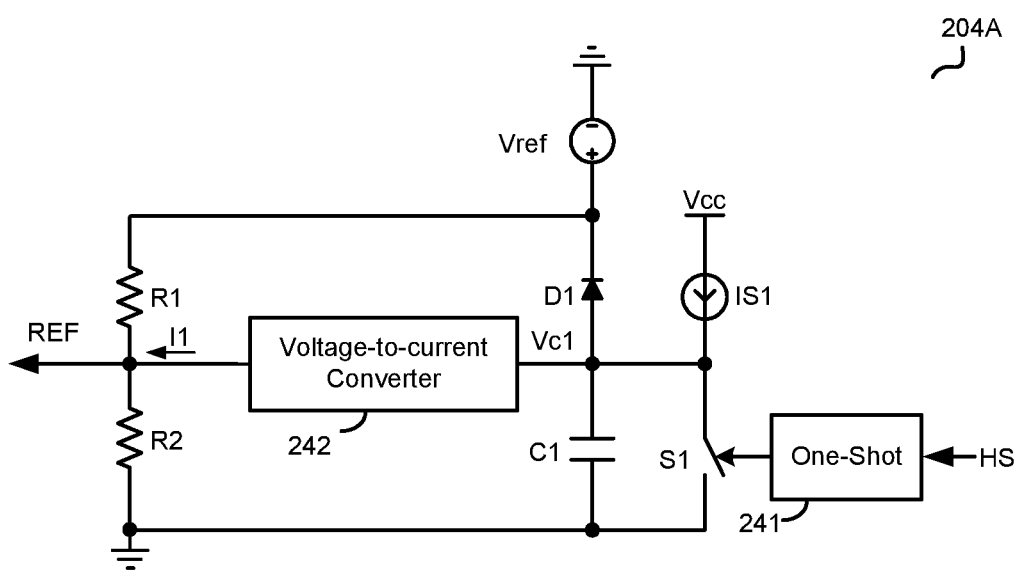
FIG. 5 illustrates the reference voltage adjusting circuit 204A in accordance with an embodiment of the present invention.

FIG. 5 illustrates the reference voltage adjusting circuit 204A in accordance with an embodiment of the present invention. The reference voltage adjusting circuit 204A comprises resistors R1, R2, a diode D1, a current source IS1, a capacitor C1, a transistor S1, a one-shot circuit 241 and a voltage-to-current converter 242. The current source IS1 has a first terminal and a second terminal, wherein the first terminal is coupled to a power supply Vcc. The capacitor C1 a first terminal and a second terminal, wherein the first terminal is coupled to the second terminal of the current source IS1, and the second terminal is coupled to ground. The one-shot circuit 241 has an input terminal and an output terminal, wherein the input terminal is coupled to receive the control signal HS. The transistor S1 has a first terminal, a second terminal and a control terminal, wherein the first terminal is coupled to the first terminal of the capacitor C1, the second terminal is coupled to ground, the control terminal is coupled to the output terminal of the one-shot circuit 241. The diode D1 has an anode and a cathode, wherein the anode is coupled to the first terminal of the capacitor C1, the cathode is coupled to the basic reference voltage Vref. The voltage-to-current converter 242 has an input terminal and an output terminal, wherein the input terminal is coupled to the first terminal of the capacitor C1, based on the voltage Vc1 across the capacitor C1, the voltage-to-current converter 242 generates a current I1 at the output terminal. The resistor R1 has a first terminal and a second terminal, wherein the first terminal is coupled to the basic reference voltage Vref. The resistor R2 has a first terminal and a second terminal, wherein the first terminal is coupled to the second terminal of the resistor R1 and the output terminal of the voltage-to-current converter 242 and is configured to provide the reference voltage REF, the second terminal is coupled to ground.

According to the embodiment shown in FIG. 5, the reference voltage REF can be expressed as:

$$REF = \frac{R2}{R1+R2} * Vref + \frac{R1*R2}{R1+R2} * I1 = \frac{R2}{R1+R2} * Vref + \frac{R1*R2}{R1+R2} * K1 * Vc1 \quad (1)$$

K1 is conversion factor of the voltage-to-current converter 242.

In each switching cycle of the switching converter, when the switch M1 is turned ON, the one-shot circuit 241 outputs a short pulse to turn ON the transistor S1, the voltage Vc1 across the capacitor C1 is discharged to zero. After that, the transistor S1 is turned OFF, the current source IS1 charges the capacitor C1, the voltage Vc1 across the capacitor C1 increases until the switch M1 is turned ON again in the next switching cycle or the voltage Vc1 increases to the basic reference voltage Vref. It can be seen from the above analysis and equation (1), the reference voltage REF is pulled down to $$\frac{R2}{R1+R2} * Vref$$

when the switch M1 is turned ON and then increases with a constant slew rate until the switch M1 is turned ON again in the next switching cycle or the reference voltage REF increases to $$\frac{R2 + R1*R2*K1}{R1+R2} * Vref.$$

Figure 6:
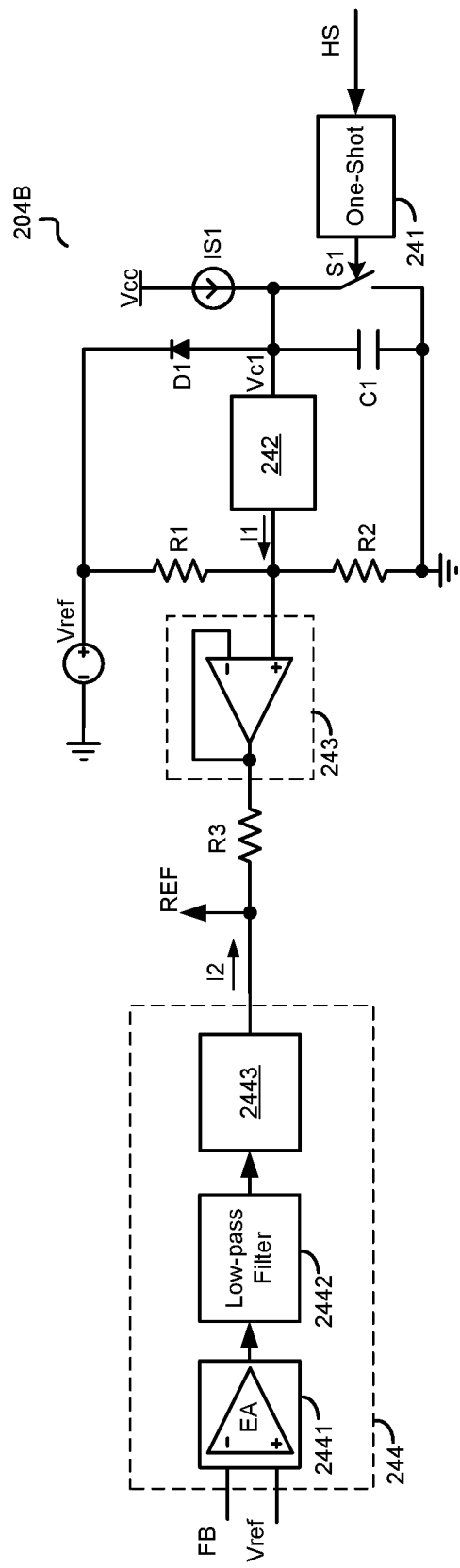
FIG. 6 illustrates the reference voltage adjusting circuit 204B in accordance with another embodiment of the present invention.

In some applications, the ESR of the output capacitor Cout may cause a DC error at the output voltage Vout. To solve this problem, the controller further includes an error compensation circuit. FIG. 6 illustrates the reference voltage adjusting circuit 204B in accordance with another embodiment of the present invention. Compared with the embodiment of FIG. 5, the reference voltage adjusting circuit 204B further comprises a buffer circuit 243, an error compensation circuit 244 and a resistor R3. The error compensation circuit 244 has a first input terminal, a second input terminal and an output terminal, wherein the first input terminal is coupled to receive the feedback signal FB, the second input terminal is coupled to receive the basic reference voltage Vref, based on the feedback signal FB and the basic reference voltage Vref, the error compensation circuit 244 generates a current I2 at the output terminal. The buffer circuit 243 has an input terminal and an output terminal, wherein the input terminal is coupled to the first terminal of the resistor R2 and the output terminal of the voltage-to-current converter 242. The resistor R3 has a first terminal and a second terminal, wherein the first terminal is coupled to the output terminal of the buffer circuit 243, the second terminal is coupled to the output terminal of the error compensation circuit 244 and is configured to provide the reference voltage REF.

According to the embodiment shown in FIG. 6, the reference voltage REF can be expressed as:

$$REF = \frac{R2}{R1+R2} * Vref + \frac{R1*R2}{R1+R2} * K1 * Vc1 + I2 * R3 \quad (2)$$

It can be seen from equation (2), in each switching cycle of the switching converter, the reference voltage REF is pulled down to $$\frac{R2}{R1+R2} * Vref + I2 * R3$$

when the switch M1 is turned ON, and then the reference voltage REF increases with a constant slew rate until the switch M1 is turned ON again in the next switching cycle or the reference voltage REF increases to $$\frac{R2 + R1*R2*K1}{R1+R2} * Vref + I2 * R3.$$

In one embodiment, the error compensation circuit 244 may comprises an error amplifier 2441, a low-pass filter 2442 and a voltage-to-current converter 2443. The error amplifier 2441 has a non-inverting input terminal, an inverting input terminal and an output terminal, wherein the inverting input terminal is coupled to receive the feedback signal FB, the non-inverting input terminal is coupled to receive the basic reference voltage Vref. The low-pass filter 2442 has an input terminal and an output terminal, wherein the input terminal is coupled to the output terminal of the error amplifier 2441. The voltage-to-current converter 2443 has an input terminal and an output terminal, wherein the input terminal is coupled to the output terminal of the low-pass filter 2442, the voltage-to-current converter 2443 provides the current I2 at the output terminal. Based on the feedback signal FB and the basic reference voltage Vref, the error compensation circuit 244 adjusts the current I2 and the reference voltage REF, this influences the frequency of the switching converter as a result of the change of the reference voltage REF, and thus avoids DC error at the output voltage Vout.

Figure 7:
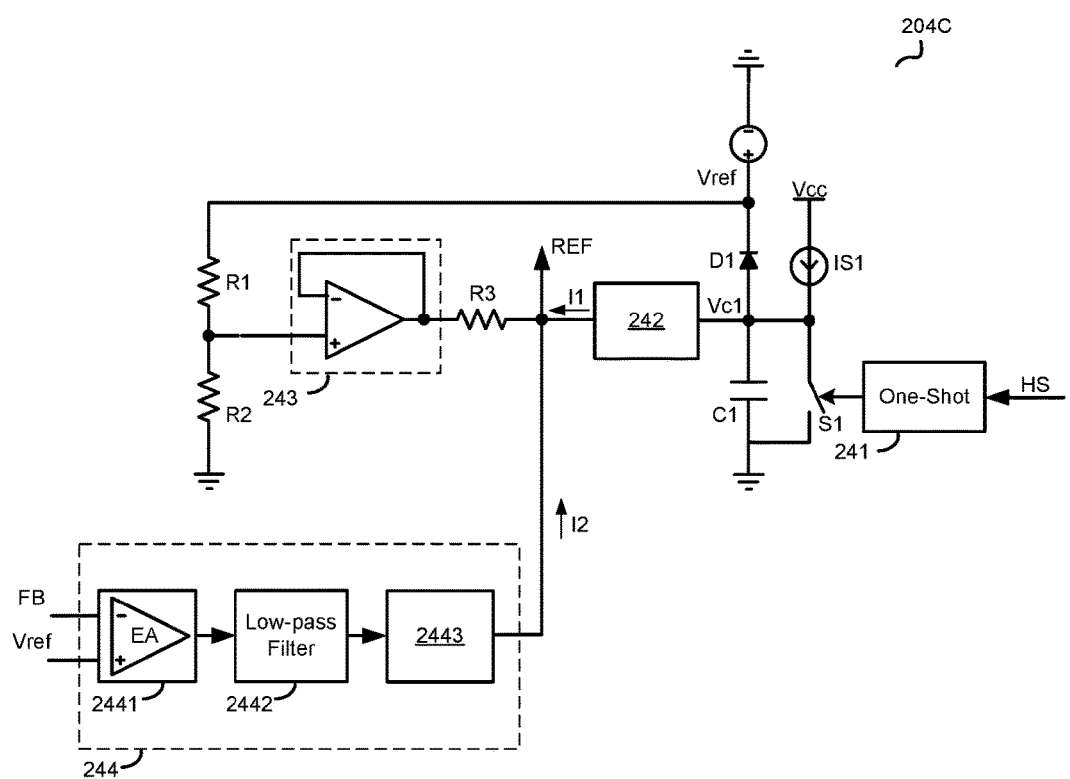
FIG. 7 illustrates the reference voltage adjusting circuit 204C in accordance with still another embodiment of the present invention.

FIG. 7 illustrates the reference voltage adjusting circuit 204C in accordance with still another embodiment of the present invention. In the embodiment of the reference voltage adjusting circuit 204C, the output terminal of the voltage-to-current converter 242 is coupled to different means when compared with the circuit 204B shown in FIG. 6. As shown in FIG. 7, the output terminal of the voltage-to-current converter 242 is coupled to the second terminal of the resistor R3 instead of the input terminal of the buffer circuit 243.

According to the embodiment shown in FIG. 7, the reference voltage REF can be expressed as:

$$REF = \frac{R2}{R1+R2} * Vref + (K1 * Vc1 + I2) * R3 \quad (3)$$

It can be seen from equation (3), in each switching cycle of the switching converter, the reference voltage REF is pulled down to $$\frac{R2}{R1+R2} * Vref + I2 * R3$$

when the switch M1 is turned ON, and then the reference voltage REF increases with a constant slew rate until the switch M1 is turned ON again in the next switching cycle or the reference voltage REF increases to $$\frac{R2}{R1+R2} * Vref + (K1 * Vref + I2) * R3.$$

Figure 8:
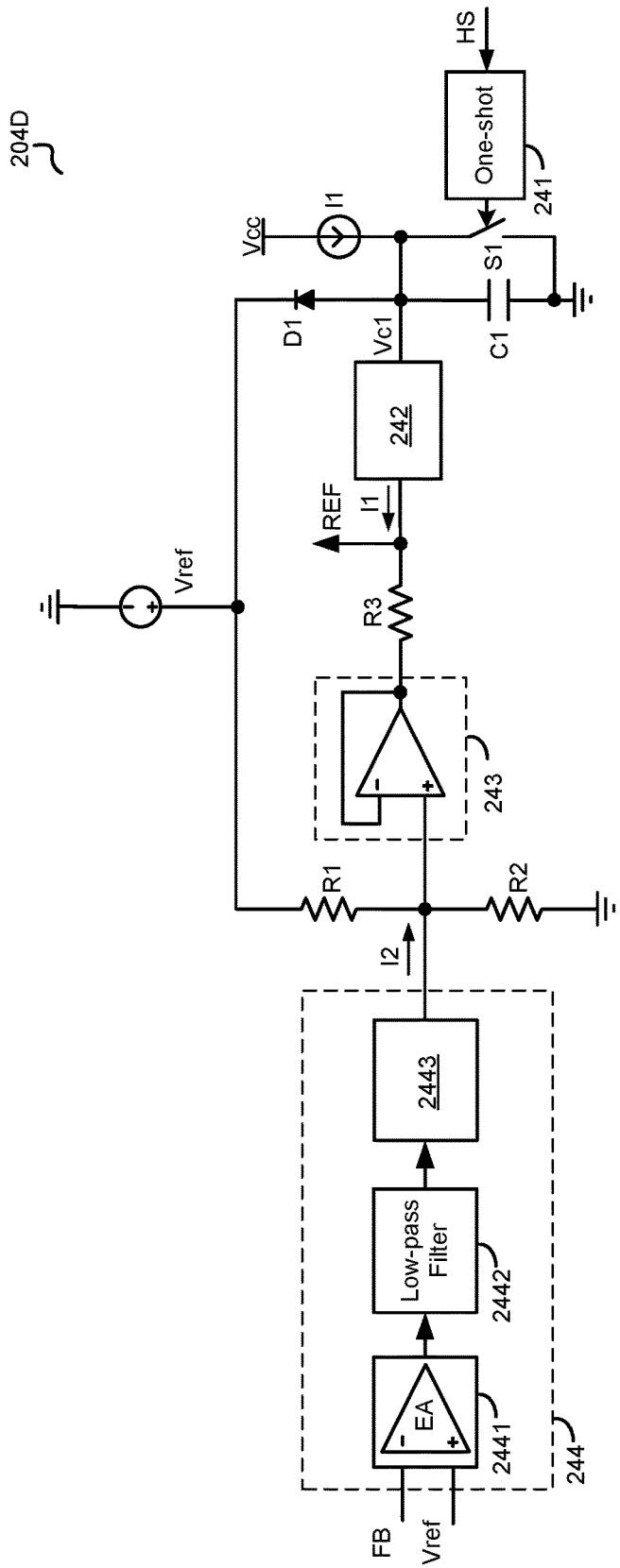
FIG. 8 illustrates the reference voltage adjusting circuit 204D in accordance with yet another embodiment of the present invention.

FIG. 8 illustrates the reference voltage adjusting circuit 204D in accordance with yet another embodiment of the present invention. When compared the reference voltage adjusting circuit 204D with the circuit 204C shown in FIG. 7, the output terminal of the error compensation circuit 244 is coupled to the first terminal of the resistor R2 and the input terminal of the buffer circuit 243 instead of the second terminal of the resistor R3.

According to the embodiment shown in FIG. 8, the reference voltage REF can be expressed as:

$$REF = \frac{R2}{R1+R2} * Vref + \frac{R1*R2}{R1+R2} * I2 + K1 * Vc1 * R3 \quad (4)$$

It can be seen from equation (4), in each switching cycle of the switching converter, the reference voltage REF is pulled down to $$\frac{R2}{R1+R2} * Vref + \frac{R1*R2}{R1+R2} * I2$$

when the switch M1 is turned ON, and then the reference voltage REF increases in a constant slew rate until the switch M1 is turned ON again in the next switching cycle or the reference voltage REF increases to $$\frac{R2}{R1+R2} * Vref + \frac{R1*R2}{R1+R2} * I2 + K1 * Vref * R3.$$

Throughout the specification, the terms "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. Moreover, the drawings are only for illustration purpose. Usually, these drawings are not necessarily drawn to scale. Persons of ordinary skill in the art will appreciate that the terms "coupled" or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

Obviously many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

What is claimed is:

1. A constant on-time controller used in a switching converter, wherein the switching converter includes a switching circuit having a main switch, the controller comprises:

an on-time control circuit configured to generate an on-time control signal which is used to control the on-time of the main switch;

a comparing circuit having a first input terminal, a second input terminal and an output terminal, wherein the first input terminal is coupled to receive a feedback signal indicative of the output voltage of the switching circuit, the second input terminal is coupled to receive a reference voltage, wherein the comparing circuit compares the reference voltage and the feedback signal and generates a comparison signal at the output terminal;

a logic circuit coupled to the on-time control circuit and the comparing circuit, wherein based on the on-time control signal and the comparison signal, the logic circuit generates a control signal to control the main switch; and a reference voltage adjusting circuit coupled to the logic circuit, wherein based on a basic reference voltage and the control signal, the reference voltage adjusting circuit generates the reference voltage, wherein in each switching cycle of the switching converter, the reference voltage is pulled down when the main switch is turned ON and increases with a slew rate until the main switch is turned ON again in the next switching cycle or the reference voltage increases to a maximum value, wherein the reference voltage adjusting circuit comprises:

a current source having a first terminal and a second terminal, wherein the first terminal is coupled to a power supply;

a capacitor having a first terminal and a second terminal, wherein the first terminal is coupled to the second terminal of the current source, and the second terminal is coupled to ground;

a one-shot circuit having an input terminal and an output terminal, wherein the input terminal is coupled to the logic circuit to receive the control signal;

a transistor having a first terminal, a second terminal and a control terminal, wherein the first terminal is coupled to the first terminal of the capacitor, the second terminal is coupled to ground, the control terminal is coupled to the output terminal of the one-shot circuit;
a diode having an anode and a cathode, wherein the anode is coupled to the first terminal of the capacitor, the cathode is coupled to the basic reference voltage;
a first voltage-to-current converter having an input terminal and an output terminal, wherein the input terminal is coupled to the first terminal of the capacitor, based on the voltage across the capacitor, the first voltage-to-current converter generates a first current at the output terminal;
a first resistor having a first terminal and a second terminal, wherein the first terminal is coupled to the basic reference voltage; and
a second resistor having a first terminal and a second terminal, wherein the first terminal is coupled to the second terminal of the first resistor and the output terminal of the first voltage-to-current converter, the second terminal is coupled to ground.

2. The controller of claim 1, wherein the slew rate is constant.

3. The controller of claim 1, wherein the maximum value equals to the basic reference voltage.

4. The controller of claim 1, wherein the reference voltage adjusting circuit further comprises:
an error compensation circuit having a first input terminal, a second input terminal and an output terminal, wherein the first input terminal is coupled to receive the feedback signal, the second input terminal is coupled to receive the basic reference voltage, based on the feedback signal and the basic reference voltage, the error compensation circuit generates a second current at the output terminal;
a buffer circuit having an input terminal and an output terminal, wherein the input terminal is coupled to the first terminal of the second resistor and the output terminal of the first voltage-to-current converter; and
a third resistor having a first terminal and a second terminal, wherein the first terminal is coupled to the output terminal of the buffer circuit, the second terminal is coupled to the output terminal of the error compensation circuit and provides the reference voltage.

5. The controller of claim 4, wherein the error compensation circuit comprises:
an error amplifier having a first input terminal, a second input terminal and an output terminal, wherein the first input terminal is coupled to receive the feedback signal, the second input terminal is coupled to receive the basic reference voltage;
a low-pass filter having an input terminal and an output terminal, wherein the input terminal is coupled to the output terminal of the error amplifier; and
a second voltage-to-current converter having an input terminal and an output terminal, wherein the input terminal is coupled to the output terminal of the low-pass filter, the second voltage-to-current converter provides the second current at the output terminal.

6. The controller of claim 1, wherein the reference voltage adjusting circuit further comprises:
an error compensation circuit having a first input terminal, a second input terminal and an output terminal, wherein the first input terminal is coupled to receive the feedback signal, the second input terminal is coupled to receive the basic reference voltage, based on the feedback signal and the basic reference voltage, the error compensation circuit generates a second current at the output terminal;
a buffer circuit having an input terminal and an output terminal, wherein the input terminal is coupled to the first terminal of the second resistor; and
a third resistor having a first terminal and a second terminal, wherein the first terminal is coupled to the output terminal of the buffer circuit, the second terminal is coupled to the output terminal of the error compensation circuit and the output terminal of the first voltage-to-current converter and provides the reference voltage.

7. The controller of claim 1, wherein the reference voltage adjusting circuit further comprises:
an error compensation circuit having a first input terminal, a second input terminal and an output terminal, wherein the first input terminal is coupled to receive the feedback signal, the second input terminal is coupled to receive the basic reference voltage, the output terminal is coupled to the first terminal of the second resistor, based on the feedback signal and the basic reference voltage, the error compensation circuit generates a second current at the output terminal;
a buffer circuit having an input terminal and an output terminal, wherein the input terminal is coupled to the first terminal of the second resistor; and
a third resistor having a first terminal and a second terminal, wherein the first terminal is coupled to the output terminal of the buffer circuit, the second terminal is coupled to the output terminal of the first voltage-to-current converter and provides the reference voltage.

8. The controller of claim 1, wherein the logic circuit turns ON the main switch when the feedback signal decreases to the reference voltage, and turns OFF the main switch when the on-time of the main switch reaches the on-time set by the on-time control circuit.

9. A switching converter, comprising:
a switching circuit having a main switch, wherein the switching circuit is configured to convert an input voltage into an output voltage;
a feedback circuit coupled to the output terminal of the switching circuit and configured to provide a feedback signal indicative of the output voltage;
an on-time control circuit configured to generate an on-time control signal which is used to control the on-time of the main switch;
a comparing circuit having a first input terminal, a second input terminal and an output terminal, wherein the first input terminal is coupled to receive the feedback signal, the second input terminal is coupled to receive a reference voltage, wherein the comparing circuit compares the reference voltage and the feedback signal and generates a comparison signal at the output terminal;
a logic circuit coupled to the on-time control circuit and the comparing circuit, wherein based on the on-time control signal and the comparison signal, the logic circuit generates a control signal to control the main switch; and
a reference voltage adjusting circuit coupled to the logic circuit, wherein based on a basic reference voltage and the control signal, the reference voltage adjusting circuit generates the reference voltage, wherein in each switching cycle of the switching converter, the reference voltage is pulled down when the main switch is turned ON and increases with a slew rate until the main switch is turned ON again in the next switching cycle or the reference voltage increases to a maximum value, wherein the reference voltage adjusting circuit comprises:
- a current source having a first terminal and a second terminal, wherein the first terminal is coupled to a power supply;
- a capacitor having a first terminal and a second terminal, wherein the first terminal is coupled to the second terminal of the current source, and the second terminal is coupled to ground;
- a one-shot circuit having an input terminal and an output terminal, wherein the input terminal is coupled to the logic circuit to receive the control signal;
- a transistor having a first terminal, a second terminal and a control terminal, wherein the first terminal is coupled to the first terminal of the capacitor, the second terminal is coupled to ground, the control terminal is coupled to the output terminal of the one-shot circuit;
- a diode having an anode and a cathode, wherein the anode is coupled to the first terminal of the capacitor, the cathode is coupled to the basic reference voltage;
- a first voltage-to-current converter having an input terminal and an output terminal, wherein the input terminal is coupled to the first terminal of the capacitor, based on the voltage across the capacitor, the first voltage-to-current converter generates a first current at the output terminal;
- a first resistor having a first terminal and a second terminal, wherein the first terminal is coupled to the basic reference voltage; and
- a second resistor having a first terminal and a second terminal, wherein the first terminal is coupled to the second terminal of the first resistor and the output terminal of the first voltage-to-current converter, the second terminal is coupled to ground.

10. The switching converter of claim 9, wherein the slew rate is constant.

11. The switching converter of claim 9, wherein the maximum value equals to the basic reference voltage.

12. The switching converter of claim 9, wherein the reference voltage adjusting circuit further comprises:
- an error compensation circuit having a first input terminal, a second input terminal and an output terminal, wherein the first input terminal is coupled to receive the feedback signal, the second input terminal is coupled to receive the basic reference voltage, based on the feedback signal and the basic reference voltage, the error compensation circuit generates a second current at the output terminal;
- a buffer circuit having an input terminal and an output terminal, wherein the input terminal is coupled to the first terminal of the second resistor and the output terminal of the first voltage-to-current converter; and
- a third resistor having a first terminal and a second terminal, wherein the first terminal is coupled to the output terminal of the buffer circuit, the second terminal is coupled to the output terminal of the error compensation circuit and provides the reference voltage.

13. The switching converter of claim 12, wherein the error compensation circuit comprises:
- an error amplifier having a first input terminal, a second input terminal and an output terminal, wherein the first input terminal is coupled to receive the feedback signal, the second input terminal is coupled to receive the basic reference voltage;
- a low-pass filter having an input terminal and an output terminal, wherein the input terminal is coupled to the output terminal of the error amplifier; and
- a second voltage-to-current converter having an input terminal and an output terminal, wherein the input terminal is coupled to the output terminal of the low-pass filter, the second voltage-to-current converter provides the second current at the output terminal.

14. The switching converter of claim 9, wherein the reference voltage adjusting circuit further comprises:
- an error compensation circuit having a first input terminal, a second input terminal and an output terminal, wherein the first input terminal is coupled to receive the feedback signal, the second input terminal is coupled to receive the basic reference voltage, based on the feedback signal and the basic reference voltage, the error compensation circuit generates a second current at the output terminal;
- a buffer circuit having an input terminal and an output terminal, wherein the input terminal is coupled to the first terminal of the second resistor; and
- a third resistor having a first terminal and a second terminal, wherein the first terminal is coupled to the output terminal of the buffer circuit, the second terminal is coupled to the output terminal of the error compensation circuit and the output terminal of the first voltage-to-current converter and provides the reference voltage.

15. The switching converter of claim 9, wherein the reference voltage adjusting circuit further comprises:
- an error compensation circuit having a first input terminal, a second input terminal and an output terminal, wherein the first input terminal is coupled to receive the feedback signal, the second input terminal is coupled to receive the basic reference voltage, the output terminal is coupled to the first terminal of the second resistor, based on the feedback signal and the basic reference voltage, the error compensation circuit generates a second current at the output terminal;
- a buffer circuit having an input terminal and an output terminal, wherein the input terminal is coupled to the first terminal of the second resistor; and
- a third resistor having a first terminal and a second terminal, wherein the first terminal is coupled to the output terminal of the buffer circuit, the second terminal is coupled to the output terminal of the first voltage-to-current converter and provides the reference voltage.

16. The switching converter of claim 9, wherein the logic circuit turns ON the main switch when the feedback signal decreases to the reference voltage, and turns OFF the main switch when the on-time of the main switch reaches the on-time set by the on-time control circuit.

* * * * *